United States Patent [19]

Fuller

[11] Patent Number: 5,452,967

[45] Date of Patent: Sep. 26, 1995

[54] PIPE LAYING SYSTEM AND METHOD

[76] Inventor: Frank E. Fuller, 16224 N. 21st St., Phoenix, Ariz. 85022

[21] Appl. No.: 215,690

[22] Filed: Mar. 22, 1994

[51] Int. Cl.⁶ .................................................... F16L 1/00
[52] U.S. Cl. .................. 405/184; 405/150.1; 405/154; 138/97; 175/61; 175/171; 175/323; 175/394
[58] Field of Search .................. 405/138, 150.1, 405/154, 184; 175/61, 171, 323, 394; 138/97, 98

[56] References Cited

U.S. PATENT DOCUMENTS

| | | | |
|---|---|---|---|
| 2,815,192 | 12/1957 | Parrish | 175/394 |
| 3,107,741 | 10/1963 | Adams et al. | 405/184 X |
| 3,162,254 | 12/1964 | Rose | 175/171 X |
| 3,174,562 | 3/1965 | Stow | 175/171 X |
| 3,767,836 | 10/1973 | Geis et al. | 175/61 X |
| 3,864,923 | 2/1975 | Turzillo | 175/171 X |
| 3,869,003 | 3/1975 | Yamada et al. | 175/171 |
| 3,945,443 | 3/1976 | Barnes | 175/61 X |
| 4,091,631 | 5/1978 | Cherrington | 405/184 |
| 4,207,130 | 6/1980 | Barber . | |
| 4,630,967 | 12/1986 | Soltau | 405/184 |
| 4,668,125 | 5/1987 | Long | 405/154 |
| 4,777,984 | 10/1988 | Storah | 138/98 |
| 4,930,542 | 6/1990 | Winkle et al. | 138/98 |
| 5,060,696 | 10/1991 | Putter | 138/98 |
| 5,101,863 | 4/1992 | Fujii et al. | 138/98 |
| 5,171,106 | 12/1992 | Rockower et al. | 405/156 |
| 5,173,009 | 12/1992 | Moriarty. | 405/154 |
| 5,192,165 | 3/1993 | Torielli | 405/156 |
| 5,213,727 | 5/1993 | Gargiulo | 264/40.3 |
| 5,314,267 | 5/1994 | Osadchuk | 405/184 |

FOREIGN PATENT DOCUMENTS

| | | | |
|---|---|---|---|
| 3306047 | 8/1984 | Germany | 405/184 |
| 43496 | 2/1990 | Japan | 405/154 |
| 149480 | 6/1991 | Japan | 405/154 |

*Primary Examiner*—John A. Ricci
*Attorney, Agent, or Firm*—LaValle D. Ptak

[57] ABSTRACT

A system for simultaneously lining and cleaning an existing sewer pipe, and for laying horizontal pipe without digging a trench, includes a planetary gear assembly mounted on a drilling rig. A liner pipe or outer pipe which is to be laid underground is placed over an inner auger, with the forward end of the liner pipe located behind the auger drill bit. The opposite end of the auger is attached to the sun gear of the planetary gear assembly; and the outer pipe is secured to the ring gear of the assembly. The auger is rotated in one direction, causing the outer pipe to rotate in the other direction; and the pipe and auger are pushed simultaneously through the pipe to be lined or through the soil. Once a section of auger and liner pipe have been pushed in place, the planetary gear assembly is disconnected from the auger and the liner pipe, new sections of auger and liner pipe are connected to the existing sections at one end, and to the planetary gear assembly at the other end. The process is repeated until the desired length of pipe is inserted into the ground. After completion of insertion of the pipe, the pipe is disconnected from the planetary gear assembly and the auger is withdrawn through the pipe for use with a subsequent installation.

21 Claims, 3 Drawing Sheets

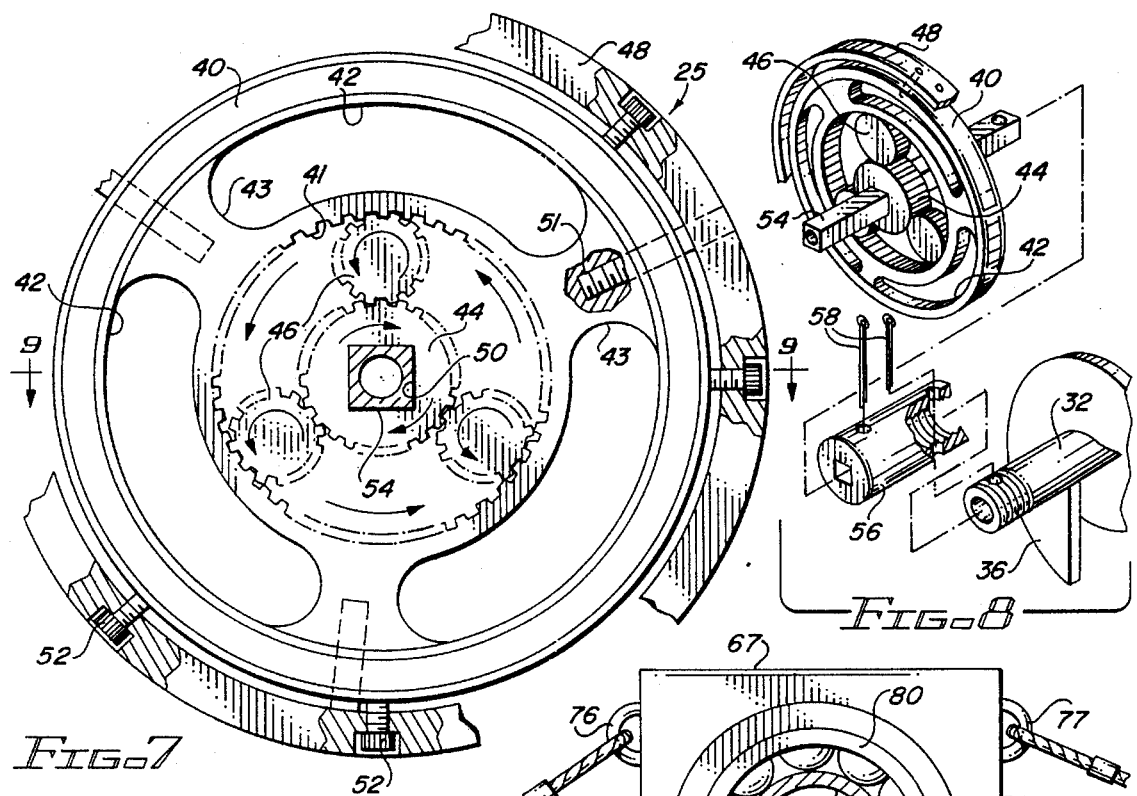
FIG-7
FIG-8
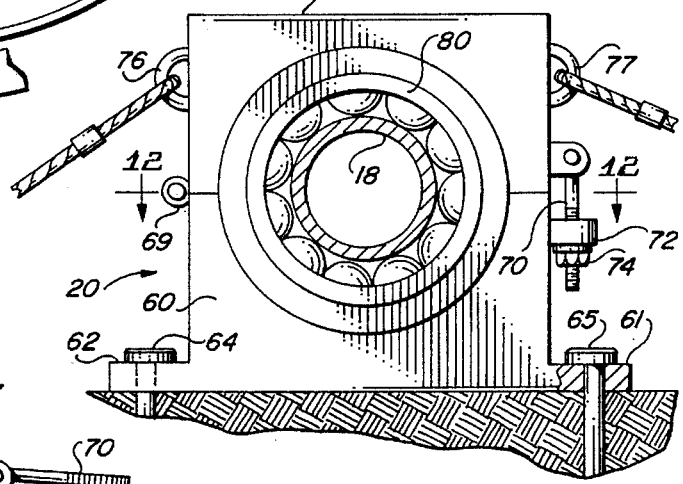
FIG-10
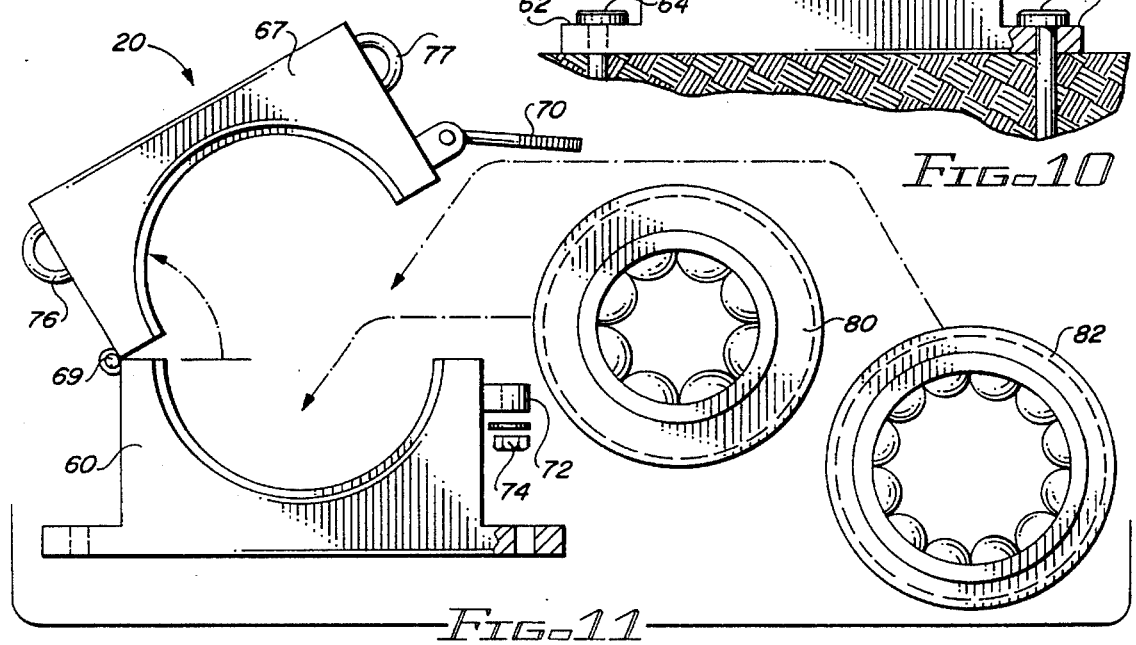
FIG-11

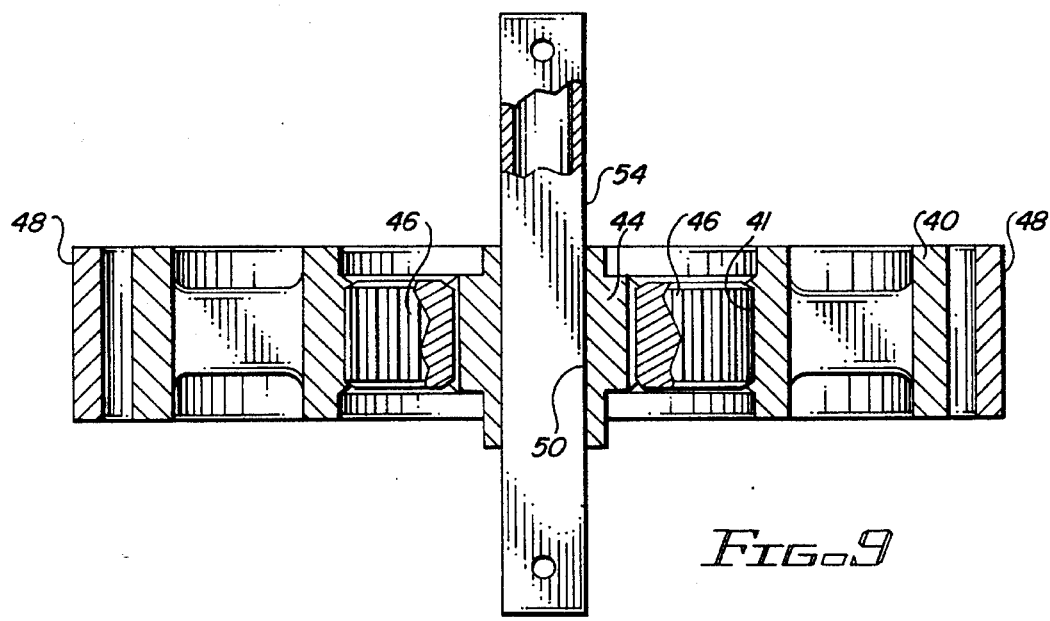
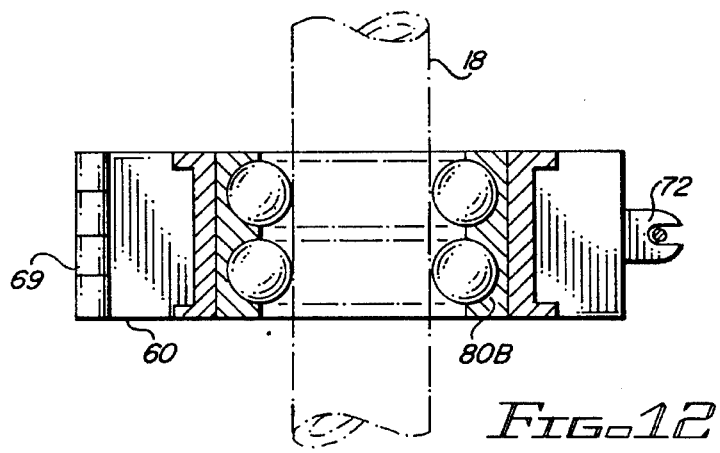
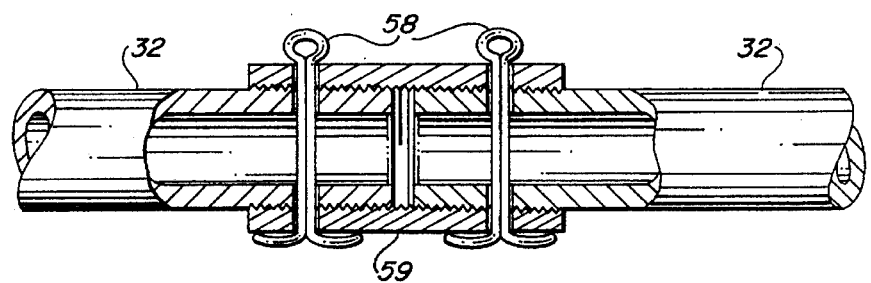

PIPE LAYING SYSTEM AND METHOD

BACKGROUND

As municipal sewer systems age, particularly those utilizing clay pipe and the like, the deteriorating pipe frequently undergoes partial collapse along its length. These collapses allow dirt, rock and other debris to enter into the pipe, impeding the flow of fluid or effluent through the sewer pipe. If a significant collapse occurs, the sewer pipe may become totally blocked. In addition, such breakage permits sewage to leak out into the surrounding ground, resulting in potential contamination of ground water and the like.

Because clay sewer pipe has been installed in large parts of the country, the deterioration of such pipe increasingly is becoming a problem for many municipalities. Where the pipe is so badly collapsed and damaged that it must be replaced, new trenches frequently are dug down to the broken pipe, it is removed, and new pipe is laid. The trenching operation is expensive and highly disruptive of the surrounding ground surface under which the clay sewer pipe has been laid. Frequently, the ground surface is covered with a roadway. In such a case, digging a trench from the surface to the pipe to lay a new sewer line or new sewer pipe damages the road, which must be repaved.

Efforts to rehabilitate old deteriorating clay pipe sewer lines have been devised for relining the deteriorating sewer lines with new pipe. Current techniques employ the slip lining of sewer lines with high density polyethylene pipe. Such polyethylene pipe is flexible and, consequently, follows the lay of the land. An important characteristic of such pipe is that it can be cold-bent to a radius of twenty to twenty-five times the pipe outside diameter; so that it may be used to negotiate relatively sharp curves.

A technique, which currently is used to reline clay sewer lines, is to dig a relatively large hole down to the sewer pipe which is to be relined. This hole typically is located no more than forty to sixty feet from a manhole cover (or up to two hundred feet if the old line is reamed out first), which provides access to the sewer pipe. The sewer pipe is broken open over a relatively long length in the hole which has been dug (typically one foot per inch of nominal diameter of the liner to be inserted). The liner pipe then is inserted into the broken-open existing sewer pipe through an entrance slope, which typically is 2:1 or flatter. A pulling line, in the form of a cable, is threaded from a winch truck, through the manhole and around a pulling assembly located in the bottom of the manhole and into the open end of the pipe. A pulling head on the line is attached to the forward end of the polyethylene liner pipe to be inserted into the sewer line. Once this is done, continuous lengths of the polyethylene pipe (connected together by heat fusion) are pulled by the pulling line through the existing sewer pipe. If any substantial amount of dirt, obstructions or broken pieces of the existing sewer pipe are encountered, the pulling head frequently becomes jammed or stuck. When this occurs, a new hole must be made at the point where the head is stuck, and steps must be taken to clear the broken pipe; so that the polyethylene liner pipe can be pulled the full length through the hole. While this system theoretically appears sound, it is one which in fact frequently encounters the obstructions noted above, and is inefficient and costly. To the extent that the underlying sewer pipe is not seriously damaged, this system, however, does permit substantial lengths of liner pipe to be pulled through existing pipe without disturbing the surface. If the underground clay pipe, however, is badly deteriorated, it often is faster and less expensive to trench the entire length from above ground and lay new pipe in a conventional manner.

The U.S. patent to Winkle U.S. Pat. No. 4,930,542 is directed to a system for restoring underground pipe. The Winkle system uses an expander/piercer head, which is pushed through the existing pipe on a section-by-section basis. The expander is operated to press outwardly the existing pipe and any earth which may have fallen into it. The expander then is retracted and moved to the next position. When it is moved to the next position, a short segment of liner pipe is pushed into the pipe behind the expander/piercer head. This step-by-step operation is continued until the length of pipe to be repaired has been fully lined with the individual liner pipe segments. In order to operate this device, it is necessary to have access to the pipe which is being repaired through a manhole or the like.

Because of the manner in which the hydraulic portions of the Winkle system operate, it is necessary to supply substantial force to the site of the manhole opposite the opening into which the piercer and the pipe segments are inserted. No curvature of any of the parts takes place in this system. There also is no boring and removal of material through the liner pipe in the operation of this system. The debris is pressed forward as the new pipe is inserted into the damaged or pre-existing sewer pipe. Obviously, if large amounts of debris are accumulated, the expander no longer can be pushed forward. When this occurs, it is necessary to dig a hole down to the point where the blockage occurs, clear the blockage, and then resume operation.

Other patents, which are directed to the insertion of liners into existing pipes, include the U.S. patents to Barber U.S. Pat. Nos. 4,207,130; Long 4,668,125; and Fujii 5,101,863. In the lining systems disclosed in these patents, the liner is pushed into the pipe. In the device of the Long patent, the pipe first is cleaned through a separate operation. After the pipe has been cleaned, the liner tube is pushed into the pipe. Liner tube is pushed into the pipe in the devices disclosed in Barber and Fujii. In neither of these patents, however, is there any provision for clearing obstructions from the existing pipe prior to or during the insertion of the liner. As a result, if large amounts of debris or serious breakage in the existing pipe is present, it will be necessary, with these systems, to dig down to the existing pipe, break it open and remove the obstruction before the insertion of the new liner pipe can be completed.

Other systems, in which the liner pipe is pulled into the main pipe, as described above, are described in the U.S. patents to Storah U.S. Pat. Nos. 4,777,984; Putter 5,060,696; Rockower 5,171,106; Moriarty 5,173,009; Torielli 5,192,165; and Gargiulo 5,213,727. Since all of these patents require a pulling of the liner into the main pipe, access entirely through the length of pipe to be relined must be available for the insertion of the pulling cable, prior to connecting it to a pulling head the end of the pipe being pulled. In some of these patents, the pipe either is expanded or broken open prior to the pulling of the liner through it; but in no case is there any boring of the pipe, or simultaneous removal of the debris through the liner as it is placed in the pipe.

It is desirable to provide a pipe relining system and a pipe laying system, which overcomes the disadvantages of the prior art noted above, which is simple and effective in operation, and which operates to push the pipe or liner pipe through the ground or existing pipe to be relined.

SUMMARY OF THE INVENTION

It is an object of this invention to provide an improved pipe laying system and method.

It is another object of this invention to provide an improved slip lining apparatus and method.

It is an additional object of this invention to provide an improved pipe lining apparatus and method, in which debris is removed from the path of the lining pipe through the lining pipe as it is being installed.

It is a further object of this invention to provide an improved pipe laying and lining apparatus and method, in which an elongated rotating auger is placed inside the pipe which being laid or used as a slip liner, with the auger head cutting away debris in front of the edge of the pipe as it is pushed forward, while debris is removed by the auger, through the pipe.

In accordance with a preferred embodiment of the invention, a method for slip lining existing sewer pipe or laying new pipe comprises providing an access hole from above ground to the depth where the pipe is to be laid. An elongated auger is placed in the pipe which is to be installed; and a cutter head on the end of the auger extends from the forward end of the liner pipe. The auger is rotated to remove debris encountered by the cutting head, through the liner pipe, toward the access hole at the opposite end of the pipe, as the pipe and auger are simultaneously pushed forward, either through an existing sewer pipe or through the ground for installation of a new pipe.

In a more specific embodiment of the invention, the pipe and auger are counter-rotated by a planetary drive unit affixed to the end where the pushing force is applied as the pipe is installed.

BRIEF DESCRIPTION OF THE DRAWINGS

FIG. 7 is an end view of a planetary gear assembly used in the embodiment of FIG. 1;

FIG. 8 is a partially exploded perspective view of the planetary gear assembly of FIG. 7 illustrating the manner of its connection to the apparatus of FIG. 2;

FIG. 9 is a top cross-sectional view taken along the line 9—9 of FIG. 7;

FIG. 10 is a detail of an embodiment of a support block of the type used in conjunction with the embodiment of FIG. 1;

FIG. 11 is an exploded view illustrating the device of FIG. 10 in an open configuration;

FIG. 12 is a cross-sectional view taken along the line 12—12 of FIG. 10; and

FIG. 13 illustrates a detail of interconnecting different sections of the embodiment of FIG. 2.

DETAILED DESCRIPTION

Reference now should be made to the drawings, in which the same reference numbers are used throughout the different figures to designate the same components.

Figure 1:
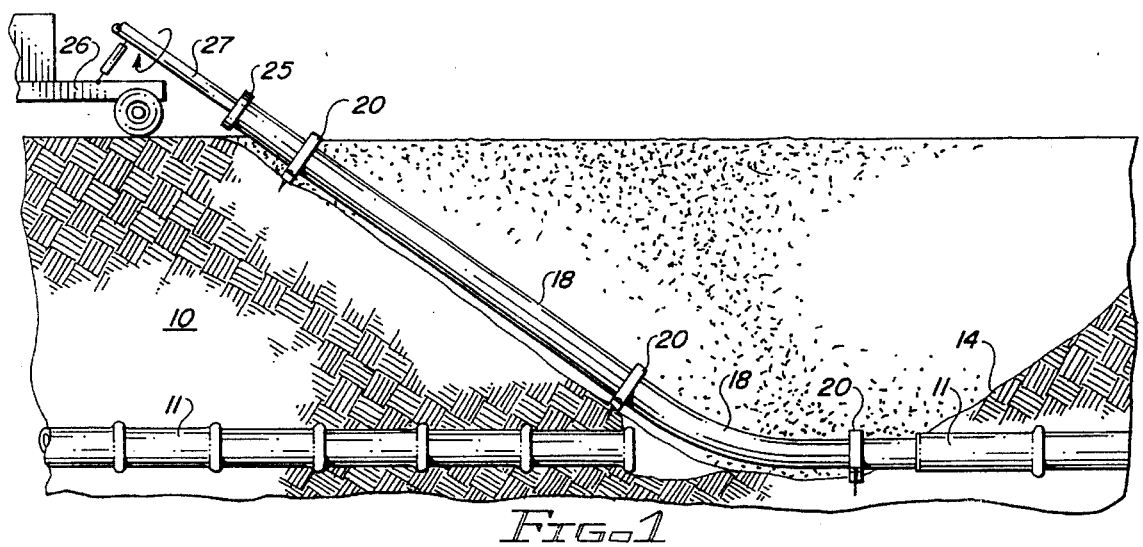
FIG. 1 is a diagrammatic representation of a preferred embodiment of the invention showing its manner of use.

FIG. 1 illustrates an application of the preferred embodiment of the invention, and shows the manner in which the invention is used for cleaning and relining clay sewer pipe or the like. The existing sewer pipe 11 is buried underground 10. When relining of the pipe 11 is desired, a hole 14 is dug in the ground to expose the pipe 11. The length of exposure typically is one foot per inch of the nominal diameter of the liner 18, which is to be inserted into the pipe 11. Thus, if the liner is 12 inches in diameter, twelve feet of the pipe 11 must be exposed. This exposed length of pipe 11 then is broken away or removed, as shown in FIG. 1, to permit placement of the liner 18 into the exposed open end of the pipe 11, shown at the right-hand side of FIG. 1.

Figure 2:
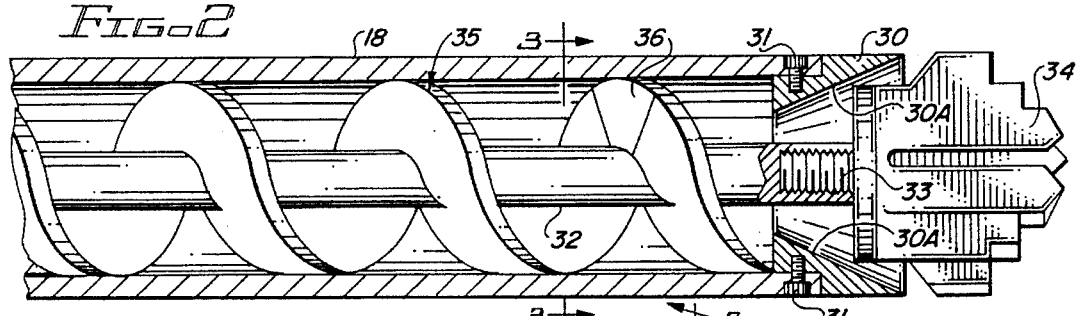
FIG. 2 is a cross section of a preferred embodiment of the invention.
Figure 3:
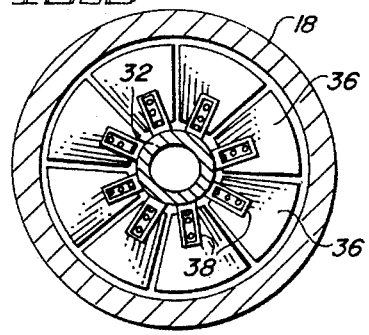
FIG. 3 is a cross-sectional view taken along the line 3—3 of FIG. 2.
Figure 4:
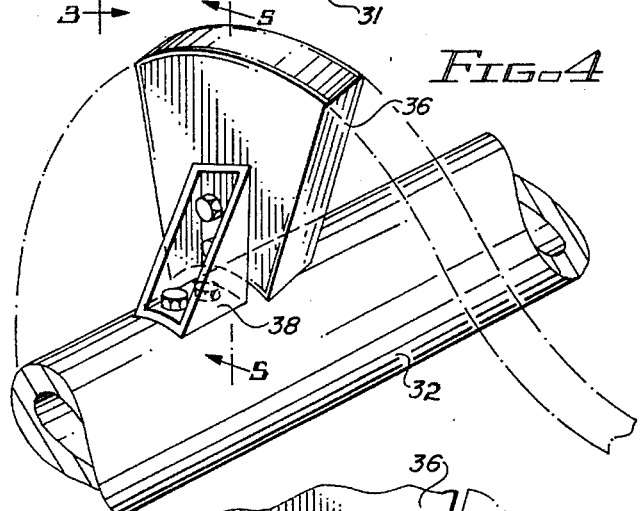
FIG. 4 is an enlarged detail of a feature of the apparatus illustrated in FIGS. 2 and 3.

The liner pipe 18. preferably is made of extra high molecular weight, extra high density polyethylene plastic (such as Plexco® by Chevron). The end section, or first section of the liner pipe 18, which is inserted into the open end of the existing sewer pipe 11, has a circular wedge-shaped leading edge member 30 attached to it by means of bolts 31 extending through the end of the pipe, as shown in FIG. 2. This leading edge member 30 has several (typically, four) helical blades 30A on the interior for moving debris from the right to the left, as viewed in FIG. 2. Before this end of the pipe 18 is inserted into the sewer line 11, however, an auger consisting of a central, hollow, flexible steel auger shaft 32 and carrying a helical auger or drag bit 35, as illustrated in FIG. 3, is inserted into the pipe 18. The forward or right-hand end (as viewed in FIG. 2) of the auger pipe 32 is internally threaded; and a conventional drag bit or auger bit 34 is attached to the end of the pipe 32 by threading it into the shaft 32, as illustrated in FIG. 2.

The nature of the drill bit 34 is determined by the characteristics of the installation which is to be made of the polyethylene pipe 18. The particular type of bit 34 which is used, however, is not of significance with respect to this invention, since the selection of the bit is made in accordance with known characteristics of drill bits and the materials through which the drill bit is intended to pass.

Typically, the initial assembly of the unit, as shown in FIG. 2, is effected in ten foot sections of both the auger 32/35 and the outer polyethylene pipe 18. Once the assembly has been made, as illustrated in FIG. 2, the lower section is placed in a pillow block guide 20. Remaining sections of the auger are connected together by threading a coupler 59 on opposing ends of the auger shaft 32, as illustrated in FIG. 13. In addition to threading the coupler 59 onto opposing shaft ends, holes are formed through the coupler 59 and the ends of the shaft sections for insertion of cotter pins or cotter keys 58, as illustrated in FIG. 14. This is done to ensure the connection between the different sections of the auger shaft 32 is maintained, both during the insertion phases of operation and subsequent withdrawal of the auger from the polyethylene pipe 18.

The different ten foot lengths or sections of the polyethylene liner pipe 18 are butted onto one another and then are fused by standard heat fusion apparatus used for this purpose. As a consequence, this standard apparatus has not been shown, since it is not significant to the features comprising the invention. As sections of the pipe 18, with the internally inserted auger 32/35 in them, are connected together, they are placed in support pillow blocks 20, as illustrated, extending up the slope of the excavation 14. Typically, the slope of the excavation has a ratio of 2:1 or flatter, which is sufficient to permit flexing of the pipe 18 and the inner auger pipe 32 in the manner shown in FIG. 1, as the pipe extends downwardly from the ground above the excavation 14, and then horizontally into the end of the sewer pipe 11. At the upper end, the auger 32/35 and liner pipe 18 are connected, in a manner described in greater detail subsequently, to a planetary gear box 25 and are secured to that gear box. The gear box 25, in turn, is attached to a "Kelly bar" 27 of a drilling rig, illustrated diagrammatically in FIG. 1 as mounted on a truck 26. The angle of the Kelly bar 27 is chosen to be in alignment with the central axis of the shaft 32 and pipe 18, again as illustrated in FIG. 1.

When the pipe 18 is to be inserted into the sewer line 11, the Kelly bar carrying the planetary gear box 25 first is raised to its start position. A new section of auger 32/35 then is connected to the preceding section, in the manner shown in FIG. 13. A new section of liner pipe 18 then is slipped over the auger, to cause the relative positioning of the parts to be as shown in FIG. 2; and the butted-together ends of this new section of pipe 18 and the previous section are fused together in any suitable manner. Once this has been done, the Kelly bar extension through the planetary gear assembly 25 is secured to the auger shaft 32; and the ring gear of the planetary gear assembly 25 is secured to the liner pipe 18.

In the subsequent operation, the Kelly bar 27 is rotated clockwise in the direction of the arrows shown in FIG. 1. The Kelly bar extends through the sun gear of the planetary gear assembly, which causes the ring gear, to which the liner pipe 18 is attached, to rotate in a counterclockwise direction. With the two pipes counterrotating in this manner, the drilling machine hydraulically pushes the Kelly bar and associated planetary gear assembly 25 downwardly toward the right, as viewed in FIG. 1, to push the cutting and cleaning bit 34 into the existing sewer pipe 11, along with the liner pipe 18.

The wedge-shaped hardened steel or hardened polyethylene edge member 30 on the front end of the pipe 18 shown in FIG. 2 facilitates the movement of the pipe 18 into the interior of the sewer pipe 11. This edge member 30 also provides space for removal of debris from the sewer pipe 11 into the open front end of the liner pipe 18 as assisted by the helical blades 30A. There, the debris is picked up by the auger 35, which continues to deliver the debris back toward the left, as viewed in FIGS. 1 and 2 through the pipe 18 up to the drill rig 26, illustrated in FIG. 1. Once a new 10 foot length (for example) of pipe 18 has been inserted into the sewer pipe 11, the planetary gear assembly 25 is disconnected, both from the liner pipe 18 and from the pipe 32 of the auger.

New sections of both the auger and the liner pipe then are connected in the same manner described above, with the left-hand or upper ends of these new sections then being connected to the planetary gear assembly, which again has been pulled to its start or retracted position. The procedure is repeated; and the new section is used to push the previous sections downwardly and then horizontally, as viewed in FIG. 1, toward the right. The process continues to be repeated over and over. The drill bit 34 is used to remove the obstructions from the sewer pipe and even broken pieces of sewer pipe 11, which may have fully collapsed. Thus, as the liner pipe 18 is pushed into the sewer pipe, obstructions do not block the pushing of the liner pipe 18 through the sewer pipe 11, since all of the blockage is removed as the pipe is used to slipline the sewer line 11. As a result, long runs of pipe may be inserted without the necessity of digging new holes, or without the requirement of moving from one nearby manhole to another. Underground, uninterrupted distances of four hundred to one thousand feet or more may be accomplished with this system, in contrast to previous sliplining systems which typically were limited to distances of forty feet to sixty feet between openings.

Once the system has drilled to a suitable manhole at the desired distance, the auger head or drill bit 34 is removed from the auger 32/35, along with the wedge-shaped extension 30 on the forward end of the liner pipe 18. Once this has been done, the liner pipe 18 is disconnected from the planetary gear assembly 25, and the auger 32/35 is rotated and withdrawn by the drill rig 26/27. As each section of the auger pipe 32 is withdrawn, it is disconnected from the previous section. The new section then is connected by lowering the planetary gear assembly 25 to make a connection between the upper end of the auger pipe 32 and the planetary gear assembly, whereupon withdrawal of the next section takes place, until the entire length of auger 32/35, which has been used in the operation, is withdrawn and removed. During the withdrawal process, the liner 18 is cleaned out by the auger 32/35; so that it is ready to use.

Reference now should be made to FIGS. 3 through 6, which illustrate details of the auger construction which is used in a preferred embodiment of the invention. The blade of the auger 35 is not made as a continuous blade, but rather comprises a series of wedge-shaped sections 36, which are attached to the auger pipe 32 by means of triangular steel supports 38, which are bolted onto the auger pipe 32 and onto the rear side of the segments 36. The segments 36 typically are made of extra high molecular weight, high density polyethylene plastic material similar to the material out of which the liner pipe 18 is made. As is apparent from an examination of FIGS. 4 and 5, the segments 36 are of a generally trapezoidal shape, with the lower end having a radius causing it to conform with the outer diameter of the pipe 32 and the outer edge having a radius which causes it to conform to the inner diameter of the liner pipe 18 (but spaced from it by about ⅛").

Figure 5:
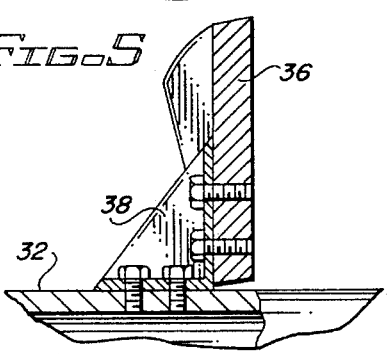
FIG. 5 is a cross-sectional view taken along the line 5—5 of FIG. 4.
Figure 6:
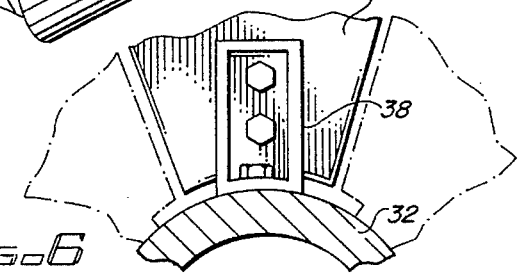
FIG. 6 is an enlarged end detail cross-sectional view of the feature shown in FIG. 4.

As illustrated in FIG. 5, eight of these segments 36 are used to encircle the pipe for each rotation of the spiral forming the auger 35. Although eight segments are shown in FIG. 5, the actual number of segments could be greater or less than this number, as desired. Whenever any one of the segments 36 becomes broken or worn out, that segment may be replaced without replacing all the others; so that the system is readily repaired in the event a portion of the auger is broken by the breaking or wearing out of a given segment 36. It should be noted also that the supports 38, which are used to attach the segments 36 to the pipe 32, have the face of the support 38 to which the segments 36 are attached, located at an angle to the axis of the shaft 32 which is selected to form the desired shape of the spiral for the particular application which is to be made in the system.

FIGS. 7, 8 and 9 illustrate the structure of the planetary gear box assembly 25, which is used to attach and rotate the auger 32/35 and the liner pipe 18, as described above. This assembly comprises an inner sun gear 44, which rotates three equally spaced planetary gears 46 to drive a ring gear 41 of the assembly. The ring gear 41 is attached by means of three spokes 43 to a spaced outer ring 42, which is selected to have an outer diameter substantially equal to the inner diameter of the liner pipe 18 for the system. A Kelly bar extension 54 is secured to a square opening in the center of the sun gear 44, as illustrated in all three FIGS. 7, 8 and 9. Consequently, when this extension 54 is attached to the Kelly bar 27 of the truck mounted drill rig 26, rotation of the Kelly bar of the drill rig causes the extension 54 to rotate. This, in turn, rotates the sun gear 44 in the direction of the arrows shown in FIG. 7. As is well known, this rotation is translated through the planetary gears 46 to rotate the ring gear 41 in the opposite direction. Thus, if the sun gear 44 is rotated clockwise, as viewed in FIG. 7, the ring gear 41 and, consequently, the outer ring 42 are rotated counterclockwise.

The right-hand end of the Kelly bar connector 54, as illustrated in FIG. 8, is releaseably connected to the upper or left-hand end of the auger pipe 32 (as viewed in FIGS. 1 and 2) by means of a connector 56. As illustrated in FIG. 8, this connector 56 is threaded onto the threaded end of the shaft 32 and includes a square hole in its center, which is slipped over the end of the square cross section Kelly bar connector. The Kelly bar connector 54 also may be further secured to the coupler 56 by means of a cotter key or pin 58 inserted through mating holes in the left-hand end of the connector 56 and the Kelly bar extension 54. A similar pin or cotter key 58 also may be used to secure the left-hand end of the shaft 32 in the right-hand end of the connector 56, as illustrated in FIG. 8. The square cross sections of the extension 54 and the intrenal hole in the left end of the coupler 56 ensure secure drive connection even without the cotter key 58.

To secure the liner pipe 18 in the planetary gear assembly 25, a clamping ring 48 is provided. This ring 48 has an internal diameter which is spaced from the external diameter of the ring 42 by an amount slightly greater than the thickness of the liner pipe 18, which is being inserted into the sewer line 11 by the system. This outer ring 48 is secured to the planetary gear assembly by means of threaded connectors 51, which extend into the spokes 43 used to space the ring 42 from the ring gear 41 of the planetary gear assembly. It should be noted that the spokes 43 cause apertures 42 to be made between the ring gear 41 and the outer ring 40 of the planetary gear assembly. To attach the assembly shown in FIGS. 7, 8 and 9 to the upper or left-hand end of a liner pipe 18, the end of the liner pipe 18 is placed between the clamping ring 48 and the outer surface of the ring 40. When it is in place, set screws 52, located about the periphery of the clamping ring 48, are turned to tightly engage the outer surface of the pipe section 18 to which they are attached. Once this has been done, operation of the system in the manner described above may be effected. As the Kelly bar 27 of the drill rig 26 rotates the Kelly bar extension 54, as shown in FIG. 7, the auger shaft 32 is rotated clockwise. At the same time, the outer liner pipe 18 is rotated counter-clockwise. This counter rotation of the two pipes continues throughout their length as they are driven into or inserted into the sewer line 11 in a section-by-section extension.

As mentioned above in conjunction with FIG. 1, support pillow blocks 20 are located at various positions along the insertion end of the liner pipe 18 ahead of the point at which it is inserted into the open end of the sewer line 18. These pillow blocks are used to prevent the pipe 18 from moving out of position due to the stresses which are placed upon it during the insertion into the sewer line 11.

A typical pillow block assembly 20 is shown in FIG. 10. This assembly includes a lower portion 60 with flanges 61 and 62 extending from opposite sides. These flanges are secured to the ground by means of stakes 64 and 65 or by means of any other suitable fasteners. An upper portion 67 is hingedly attached along one edge to the lower portion 60 by means of a hinge 69. The manner of this attachment is shown most clearly in FIG. 11. At the top, on opposite sides of the upper portion 67, a pair of securing loops 76 and 77 are provided. These loops may be attached to suitable guy wires, which further are used to hold the support blocks 20 in place during operation of the system.

As illustrated in FIGS. 10, 11 and 12, ball bearings 80 or 82 for facilitating the rotation of the liner pipe 18 are placed in the pillow blocks 20 and are clamped in place by means of a hinged clamp pin 70 and latch 72, secured in place by a nut 74, as illustrated in FIGS. 10 and 11. When ball bearings 80 or 82 of the type shown in FIGS. 10 and 11 are used, they initially are slipped over the open end of the pipe 18 when the installation first is begun. Then the bearings 80 or 82 are clamped and held in place by the two halves of the pillow blocks 60 and 67, as illustrated in FIGS. 10 and 11. It should be noted that different ball bearing races made to fit within the same configuration of a pillow block 20 may be employed; so that for smaller pipes 18 a smaller bearing, such as the bearing 80, may be used; and for larger pipes 18, a larger bearing, such as the bearing 82, may be used. In any event, when a ball bearing 80 or 82 of the type shown in FIGS. 10 and 11 is used, it is necessary to separately place the bearing over the open end of the pipe and then secure it in place in the pillow block assembly 20 during the initial stages of operation.

It should be noted that as debris is removed by the auger 32/35 and pushed upwardly or toward the left as viewed in FIGS. 1 and 2, the dirt and debris which exits from the open end of the upper or last section of the liner pipe 18 passes through the openings 42 in the planetary gear assembly 25. This debris then is deposited above ground, at the location of the drill rig 26. It may be removed from the position immediately adjacent the planetary gear assembly 25 by means of a conveyor belt or other suitable apparatus. This prevents a large accumulation of dirt and debris, which might otherwise impede the operation described above for attaching and pushing new sections of liner pipe and auger 32/35 into the sewer line 11. Since a large amount of dirt is transported out of the open end of the liner pipe 18 by the auger 32/35, a standard seal plate (not shown) is placed on both sides of the planetary gear assembly, located on the inside of the ring gear; so that dirt pushed out of the end of the pipe exits only through the apertures 42, and does not get into the planetary gear assembly 44/46/41.

For some applications, the auger bit 34 also may be attached to a pulling cable to create a push-pull insertion of the pipe 18 through the line 11.

While the foregoing description of the preferred embodiment of the invention has been made in conjunction with the utilization of the invention for slip lining a pre-existing sewer pipe or the like, the invention also may be used for directly laying pipe 18 in virgin ground, without the requirement that it be used to slipline a pre-existing damaged sewer line. Because the auger has a drill bit on its end, the system may be used for drilling a horizontal (or other orientation) line and simultaneously laying the pipe and removing the dirt in the same manner described above for the operation for slip lining an existing sewer line. When the system is used in this manner, a booting system similar to those used in offshore directional drilling systems may be used to control the direction of drilling. The operation of the system is identical, whether it is used in this manner or for the slip lining operation described in detail above.

Since the auger shaft 32 is hollow, it may be used to transport a drilling solution (such as water and polymer) under pressrue to the drill bit 34 from the drilling rig 26. The apparatus for doing this is conventional drilling apparatus;

and for that reason, it has not been shown in the drawing.

For the "fast push" used to reach the end of the insertion, pipe sections 32 without the auger blade sections 36 are connected between the left hand end of the auger 32/35 and the Kelly bar extension 54 and the planetary gear box 25 is connected to the left-hand end of the final section of the liner pipe 18, which is to remain in the ground, without adding further lengths of pipe 18 to extend up the slope of the hole to the drilling rig 26.

Various changes and modifications will occur to those skilled in the art for performing substantially the same function, in substantially the same way, to achieve substantially the same results, without departing from the true scope of the invention as defined in the appended claims.

I claim:

1. A method for slip lining an existing sewer pipe including the steps of:

providing an access hole from above ground to the existing sewer pipe;

making an opening in the existing sewer pipe for entry of a liner pipe;

placing an elongated auger in said liner pipe, with said auger extending from the end of said liner pipe;

rotating said auger to remove debris through said liner pipe toward said access hole; and simultaneously pushing said liner pipe and said auger through said existing sewer pipe.

2. The method according to claim 1 further including the step of simultaneously rotating said auger and said liner pipe in opposite directions as said liner pipe and said auger are pushed through said existing sewer pipe.

3. The method according to claim 2 further including the step of adding additional sections of liner pipe and auger to the end being pushed through said sewer pipe as said auger and liner pipe extend into said sewer pipe.

4. The method according to claim 3 further including the step of removing debris from said auger as said liner pipe and said auger are pushed through said existing sewer pipe.

5. The method according to claim 1 further including the step of removing debris from said auger as said liner pipe and said auger are pushed through said existing sewer pipe.

6. The method according to claim 1 further including the step of adding additional sections of liner pipe and auger to the end being pushed through said sewer pipe as said auger and liner pipe extend into said sewer pipe.

7. The method according to claim 1 further including the step of leaving the liner pipe in place and removing the auger therefrom.

8. A method for laying pipe which is particularly useful in laying horizontal pipe including the steps of:

providing an access hole from above ground to the depth said pipe is to be laid;

placing an elongated auger in said pipe, with said auger extending from a first end of said pipe;

rotating said auger to remove debris through said pipe toward said access hole; and simultaneously rotating said pipe and said auger in opposite directions and pushing said pipe and said auger through the ground.

9. The method according to claim 8 further including the step of removing debris from said auger at the end of said pipe adjacent said access hole.

10. The method according to claim 8 further including the step of leaving the pipe in place and removing the auger therefrom.

11. The method according to claim 8 further including the step of removing debris from said auger at the end of said pipe adjacent said access hole.

12. A pipe cleaning and liner laying system for simultaneously cleaning and lining existing pipes including in combination:

a mechanism for holding an outer liner pipe and for holding and rotating an inner auger;

an outer liner pipe section coupled to said mechanism;

an auger section placed inside said outer liner pipe section and coupled to said mechanism;

apparatus for operating said mechanism to rotate said auger section within said outer pipe section;

a cutter head on the end of said auger section extending beyond said outer liner pipe section for cutting away debris in said existing pipe to be lined, whereby said auger section causes said debris to be moved through said liner pipe section for removal therefrom; and apparatus for simultaneously pushing said liner pipe section and said auger pipe section through said pipe to be lined.

13. The combination according to claim 12 wherein said mechanism is a planetary gear mechanism for holding and simultaneously rotating said outer liner pipe section and said auger section in different directions.

14. The combination according to claim 13 wherein said liner pipe is made of polyethylene material.

15. The combination according to claim 14 wherein said auger is made of replaceable polyethylene sections.

16. The combination according to claim 12 wherein said liner pipe is made of polyethylene material.

17. A pipe laying system including in combination:

a planetary gear mechanism for holding and rotating an outer pipe and for holding and rotating an inner auger, said outer pipe and said auger being rotated in opposite directions;

an outer pipe coupled to said mechanism;

an auger placed inside said outer pipe and coupled to said mechanism;

apparatus for operating said mechanism to rotate said auger within said outer pipe, whereby said auger causes debris to be moved through said outer pipe for removal therefrom; and apparatus for simultaneously pushing said outer pipe and said auger through the ground.

18. The combination according to claim 17 wherein said auger comprises a central pipe having spiral flutes extending along the length thereof.

19. The combination according to claim 18 wherein said spiral flutes comprise individual replaceable sections removably mounted on said central pipe.

20. The combination according to claim 19 wherein said liner pipe is made of polyethylene material.

21. The combination according to claim 20 wherein each of said replaceable sections of said auger is made of polyethylene.

\* \* \* \* \*